United States Patent [19]

Abels et al.

[11] 4,189,020
[45] Feb. 19, 1980

[54] FORK-LIFT TRUCK WITH INTERNAL-COMBUSTION ENGINE

[75] Inventors: Theodor Abels; Bernhard Götz, both of Aschaffenburg, Fed. Rep. of Germany

[73] Assignee: Linde Aktiengesellschaft, Wiesbaden, Fed. Rep. of Germany

[21] Appl. No.: 857,192

[22] Filed: Dec. 2, 1977

[30] Foreign Application Priority Data

Dec. 7, 1976 [DE] Fed. Rep. of Germany ....... 2655441

[51] Int. Cl.² .............................................. B60K 11/08
[52] U.S. Cl. .................. 180/54 A; 181/204; 280/759
[58] Field of Search ............... 180/54 A, 64 A, 69 R, 180/68 P; 280/759; 181/204, 229, 224; 214/142

[56] References Cited

U.S. PATENT DOCUMENTS

| | | | |
|---|---|---|---|
| 2,256,314 | 9/1941 | Dunham | 280/759 |
| 3,147,814 | 9/1964 | Suhre | 181/204 |
| 3,642,092 | 2/1972 | Cederbaum | 181/204 |
| 3,923,114 | 12/1975 | Suzuki | 180/54 A |
| 3,970,161 | 7/1976 | Rowe et al. | 180/68 P |
| 3,989,415 | 11/1976 | Van Hee et al. | 181/224 |
| 4,071,009 | 1/1978 | Kraina | 180/54 A |

FOREIGN PATENT DOCUMENTS

| | | | |
|---|---|---|---|
| 254069 | 1/1963 | Australia | 181/204 |
| 1456887 | 12/1968 | Fed. Rep. of Germany | 214/142 |

*Primary Examiner*—David M. Mitchell
*Attorney, Agent, or Firm*—Karl F. Ross

[57] ABSTRACT

A fork-lift truck having a chassis provided with a counterweight to balance the weight of a load carried by the mast and fork of the vehicle and an internal-combustion engine for propelling the vehicle, e.g. via a hydrostatic transmission, has the passages for the flow of cooling air to and from the engine formed directly in the counterweight and provided with flow-deflecting bends to serve as noise dampers. The noise at least emitted from the intake duct is thus partially damped by absorption of acoustic energy in the relatively massive counterweight.

12 Claims, 3 Drawing Figures

FORK-LIFT TRUCK WITH INTERNAL-COMBUSTION ENGINE

FIELD OF THE INVENTION

The present invention relates to a fork-lift truck provided with an internal-combustion engine and with a counterweight and, more particularly, improvements in the noise-damping or absorption of acoustic energy and vibration in such vehicles.

BACKGROUND OF THE INVENTION

It is known to provide fork-lift trucks with a chassis having wheels which can be driven directly or indirectly from an internal-combustion engine and provided at one end of the chassis, in the direction of displacement thereof, with a mast upon which a fork is vertically displaceable. At the other end of the chassis, a counterweight is provided to balance the load which may be lifted by the fork, thereby preventing tipping of the chassis of the vehicle about the front wheels thereof.

When an internal-combustion engine constitutes the prime mover of the vehicle, it may be used to drive a hydrostatic transmission, i.e. the axial-piston pump of a hydrostatic transmission whose hydrostatic motor or motors is or are connected to the propelling wheels of the vehicle.

The internal-combustion engine is a substantial source of noise and vibration and it is known that the acoustic output of the engine radiates from practically all of its external surfaces.

However, it has been found that substantial noise is also emitted through the intake passages of the engine.

With air-cooled internal-combustion engines, the cooling blower or fan constitutes an additional noise source and noise is also produced by the ribbed cylinders and the cylinder head. Not only does noise of the internal working of the engine radiate from these surfaces, but the passage of air over the ribbed cylinders and cylinder head produces additional noise. Thus the air-cooling passages of the engine constitute a significant contributor to the noise output of this machine.

In water-cooled internal-combustion engines, the noise is emitted from the surfaces of the engine and from the fan which draws air through the radiator serving to cool the liquid circulated within the engine.

As a consequence, an internal-combustion engine when used in a fork-lift truck constitutes a substantial noise source. This noise is in addition to the noise generated by the propelling transmission, i.e. the hydrostatic pump mentioned previously for propelling the vehicle as well as the pumps provided for auxiliary functions including lifting the fork, power steering and the like.

In conventional fork-lift trucks, the internal-combustion engine and the remaining drive elements mentioned previously can be provided in a free space, hereinafter referred to as the engine compartment, which can be open into a warehouse or other building in which the vehicle may be used. In general, the noise-damping effects of conventional means for reducing the output of the engine compartment used heretofore have been of limited success.

For example, in LINDE fork-lift trucks, attempts have been made heretofore to minimize the noise output but even in these systems straight passages are provided through the counterweight for drawing the cooling air into the system or blowing the cooling air out of the latter. However, the engine compartment is provided with a synthetic-resin hood which emits significantly less sound than sheet-metal hoods which have been used widely heretofore. The interior of the engine compartment and the inner surfaces of the hood can be provided with layers of acoustic damping. Nevertheless the drive systems for such fork-lift trucks have been known to have extremely high noise outputs which have rendered them disadvantageous and frequently unusable in certain locations or in many applications.

OBJECTS OF THE INVENTION

It is the object of the present invention to reduce the noise output from a fork-lift truck driven by an internal-combustion engine. It is a corollary object of the invention to improve the air flow to and from such an engine.

Finally, in this connection, it is an object of the present invention to provide a fork-lift truck which eliminates some of the disadvantages of earlier systems as discussed above.

SUMMARY OF THE INVENTION

We have found, most surprisingly, that these objects can be attained by providing the air-flow passages to and/or from the engine for the cooling thereof within the counterweight and in a nonlinear manner, i.e. with baffling or deflecting curvatures so that a straight line between the inlet opening and the outlet opening of each passage does not exist.

More particularly, the present invention provides a fork-lift truck having a chassis formed with a closed engine compartment and an internal-combustion engine within this compartment for driving the fork-lift truck and provided with means for inducing the flow of air into the compartment and discharging the cooling air, after at least partial heating thereof, from the compartment. The chassis is also provided with a counterweight for balancing the load which may be carried by the fork.

According to an essential feature of the invention, the total air stream to or from the engine compartment is passed through respective passages or ducts formed directly in the counterweight and these ducts are provided with flow-deflecting curvatures or angles which serve as acoustic-damping means.

The large mass of the counterweight is thus utilized to absorb the noise energy and serves as the acoustic-damping for the engine at least insofar as the sound transmitted along the paths of the incoming and outflowing air streams are concerned. Because of the large mass of the counterweight, it has been found that in spite of the metallic connection between the walls of the passages and the outer surfaces of the counterweight, an effective acoustic-damping prevails and sound-emission is markedly reduced.

When the passages are so curved that there is no straight-line connection between the two openings of the opposite ends of each passage, the acoustic vibrations cannot pass directly outwardly and in fact are reflected inwardly and partially absorbed by impingement upon the deflecting surfaces along the path.

The deflections of the passages thus eliminate direct transmission of noise from the engine compartment outwardly through the passages.

The acoustic output of the vehicle can be further reduced by acoustically insulating the engine compartment to the greatest possible extent and maintaining the latter completely closed except for the air intake and discharge passages. Acoustic lining of this type can be applied in layers along all of the inner walls of the engine compartment.

In addition, where sheet metal parts are provided in or adjacent the engine compartment, e.g. the foot plate of the driver's post or station of the vehicle, these are also provided with acoustic-damping mats.

It has been found to be especially simple to completely seal the engine compartment and to acoustically isolate it when the force transmission between the engine and the drive wheels of the vehicle is effected by a hydrostatc transmission of the separable type, i.e. the type in which the pump is separate from the motor or motors of the transmission and energy transfer between the pump and the motor or motors is effected by ducts communicating the hydraulic fluid between them. In this case, the hydraulic motors can be mounted on the axles of the driven wheels or upon the wheels themselves. Hence only the pump part of the hydrostatic transmission need be enclosed in the engine compartment..

Auxiliary devices which tend to generate noise, such as the pump for the fork-lifting hydraulic system, the pump for a possible power-steering device and/or the pump for tilting the mast upon which the fork is displaceable can be enclosed in this sealed engine compartment.

By drawing the combustion air for the internal-combustion engine also through the intake passage traversing the counterweight and provided with one or more deflections in the manner described, an additional noise-damping effect can be gained. In this case even the intake noise is substantially completely damped.

Naturally, not only the counterweight but other parts of the vehicle may be used to maximize the sound-damping effect. For example, when a water-cooled internal-combustion engine is employed, the radiator or heat exchanger between the coolant of the engine and the air can be provided in the engine compartment so that the air drawn through the intake passage of the counterweight will also pass through the radiator. As a consequence, the radiator serves as an additional acoustic damper since the shock waves or acoustic waves are broken or interrupted at least in part by the vanes, ribs or lamellae of the radiator. Only a limited acoustic-energy transmission to the cooling-air passage can occur.

The same applies for the oil cooler for the lubricating oil of the internal-combustion engine and/or for the cooling of the hydraulic fluids used in the apparatus.

It has been found to be advantageous when the passages are formed as relatively flat conduits or ducts which extend over relatively larger portions of the width of the counterweight.

It has been found to be advantageous when the air passage in the region of the mouth thereof extends upwardly, thereby preventing the flow of rain water into the passage and providing a direction change between the approximately horizontal flow direction and the flow direction in the upwardly extending portion to constitute a deflection preventing the linear discharge of sound energy in the manner previously described. Advantageously between the passage and the internal-combustion engine there is provided a relatively large plenum or quiescence chamber for the flow, this chamber being connected by a funnel-shaped flow-cross-section with the passage.

Advantageously, the counterweight is constituted from two parts which are assembled together, thereby facilitating fabrication of the counterweight and the ducts or passages therein and enabling only parts of a complete counterweight to be used for fork-lift trucks which are to have smaller capacities. In this case, only one part of the counterweight need be provided upon the vehicle chassis. In a preferred construction of the invention, the counterweight is subdivided in the plane of the air-flow passage to facilitate the formation thereof in the relatively massive body which constitutes the counterweight.

According to another feature of the invention, the flow passage is provided with baffle walls which extend perpendicular to the flow direction and face in the direction of the noise source, namely, the engine compartment and the engine. These walls may be provided with acoustic-damping mats. At least part of the flow passage may be lined with acoustic-damping mats in addition or alternatively.

When a water cooler or oil cooler is provided for the engine, it may be located within the air-flow passage preferably in a region thereof proximal to the noise source.

The flow passage is preferably broader than it is high and in a preferred construction of the system the counterweight is provided with two flow passages for the inflow and discharge of the air. Both of these passages can extend substantially parallel to one another and can be provided at their mouths with guide surfaces which direct the flows in opposite directions.

When the engine is provided with a separate air intake duct for the combustion air, this can open in the air-flow passage.

When only one passage is provided in the counterweight, at least on one side of the fork lift and preferably on both sides thereof, air gaps are provided which extend at least approximately vertically and have terminal portions which lie substantially horizontally. These wall portions can be lined with acoustic-damping layers.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
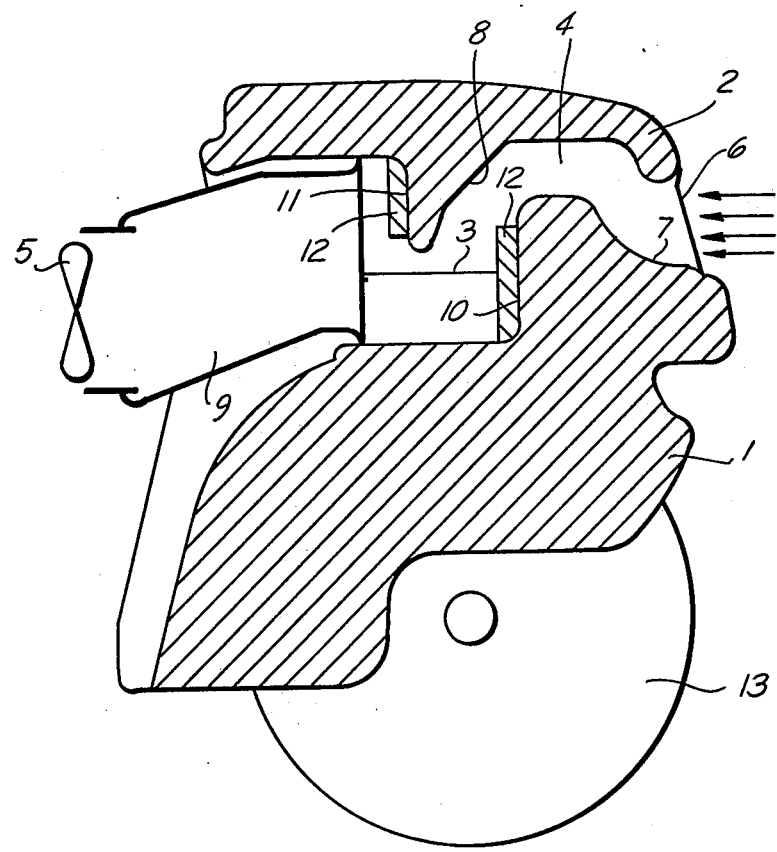
FIG. 1 is a diagrammatic vertical cross-sectional view through a portion of the counterweight of a fork-lift truck according to the invention, the section being taken in a plane parallel to the longitudinal median plane of the fork-lift truck.

The counterweight (FIGS. 1 and 2) comprises a lower part 1 and an upper part 2 which can be connected along a separating plane 3. Between the two parts 1 and 2, there is defined an air-intake passage 4 through which cooling air is drawn by means of the fan 5 of an internal-combustion engine, not shown in detail, into the engine compartment 60 of the chassis. The engine compartment is completely sealed except for the air-intake and discharge passages.

Inwardly from the outer mouth or opening (orifice) 6 of the passage 4, there is provided an upwardly curved wall 7 which deflects the air upwardly. Since this wall 7 can be visible from the exterior, it can be advantageously provided with a legend designating the manufacturer of the vehicle.

Figure 2:
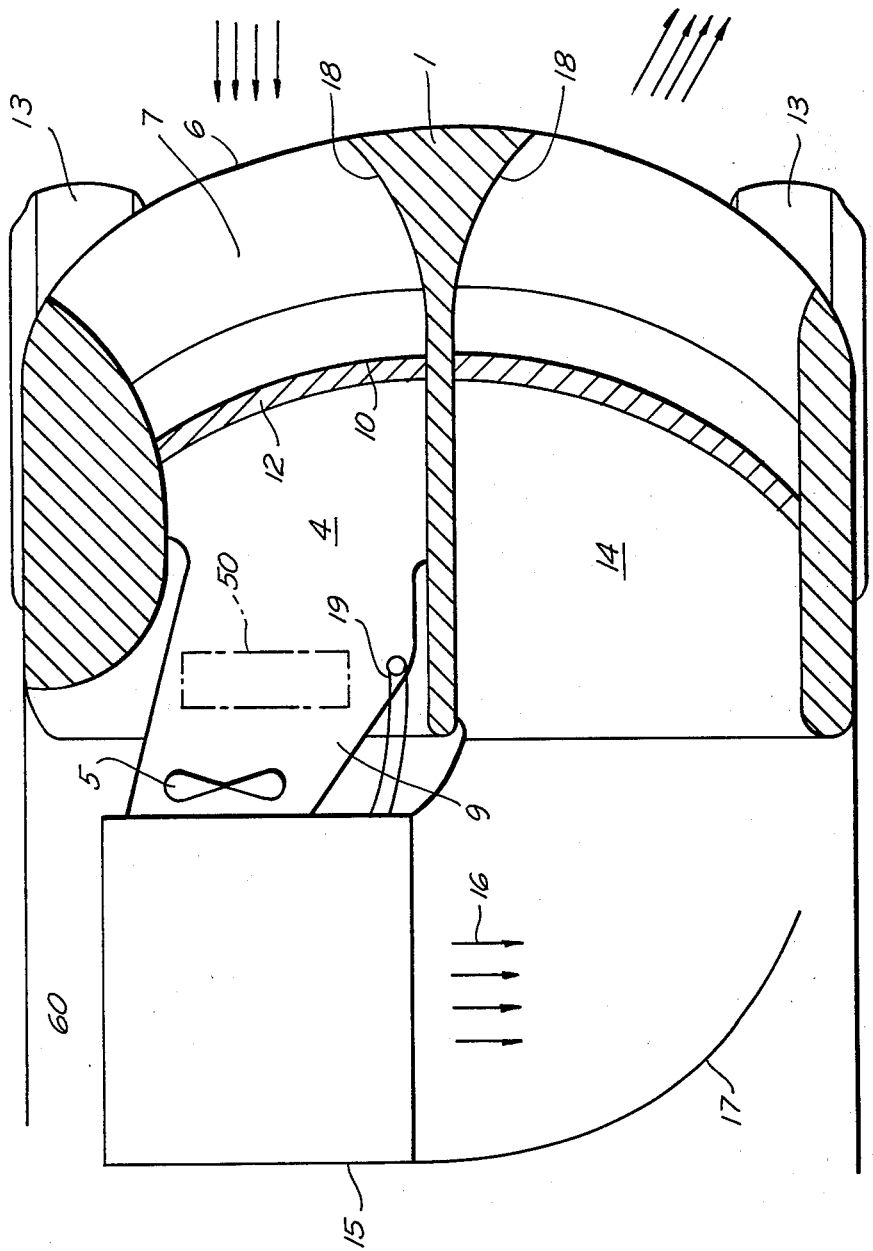
FIG. 2 is a horizontal section through the counterweight in the plane of the air-flow passages.

To the rising part of the passage 4, there is connected a short horizontal part (FIG. 2). Via the inclined wall 8, the air stream is deflected again downwardly and then flows to an intake funnel 9 of the fan 5.

The wall of the passage 4 is provided with two vertical wall portions 10 and 11 which are turned in the direction of the engine and upon which acoustic-damping mats, i.e. sound-insulation lining 12, are fastened, preferably by an adhesive.

The wheels 13 of the vehicle are shown only diagrammatically and are mounted upon an axle which is affixed to the lower counterweight part 1. They may be driven by hydrostatic motors connected via ducts to a pump of the variable-displacement axial-piston type driven by the engine (see, in this connection, our copending application Ser. No. 865,299 now U.S. Pat. No. 4,161,992, filed Dec. 28, 1977, based upon German application P 26 59 282.5 filed Dec. 29, 1976).

From FIG. 2, it will also be apparent that the counterweight 1, 2 is provided, symmetrically with the passage 4, with a discharge passage 14. The cooling air is drawn in by the blower 5 through the passage 4, passes over the cooling ribs of the internal-combustion engine 15 or through the radiator or or oil cooler 50 thereof, the cooling air being discharged in the direction of arrow 16. The cooler 50 is disposed in the air-flow passage 4 proximal to the engine 15.

A guide member 17, which can also be acoustically lined and can be composed of sheet metal or a synthetic resin or rubber having better sound-damping properties, deflects the heated cooling air in the direction of the mouth of the passage 14.

The passages 4 and 14 are formed in the region of their outer orifices with approximately vertical walls 18 which are curved in opposite directions with respect to the axes of the flow passages to deflect the outflowing stream away from the incoming air stream. This prevents the intake of warm air which has been discharged through duct 14.

The passages 4 and 14 can be mirror-symmetrical and otherwise completely identical, i.e. can have the same deflections and turns. They can, however, have different configurations and their respective flow-deflecting paths can be shaped so as to minimize flow resistance.

In fact, because of the relatively large free flow cross sections of the passages, there is little flow resistance. The intake air for the combustion process within the engine is drawn from the intake manifold which communicates via a duct 19 with the flow passage 4 and preferably includes the usual air filter. In the region of the mouth of the funnel 9, there is provided the oil cooler 50 or the water cooler when the internal-combustion engine is of the water-cooled type.

Figure 3:
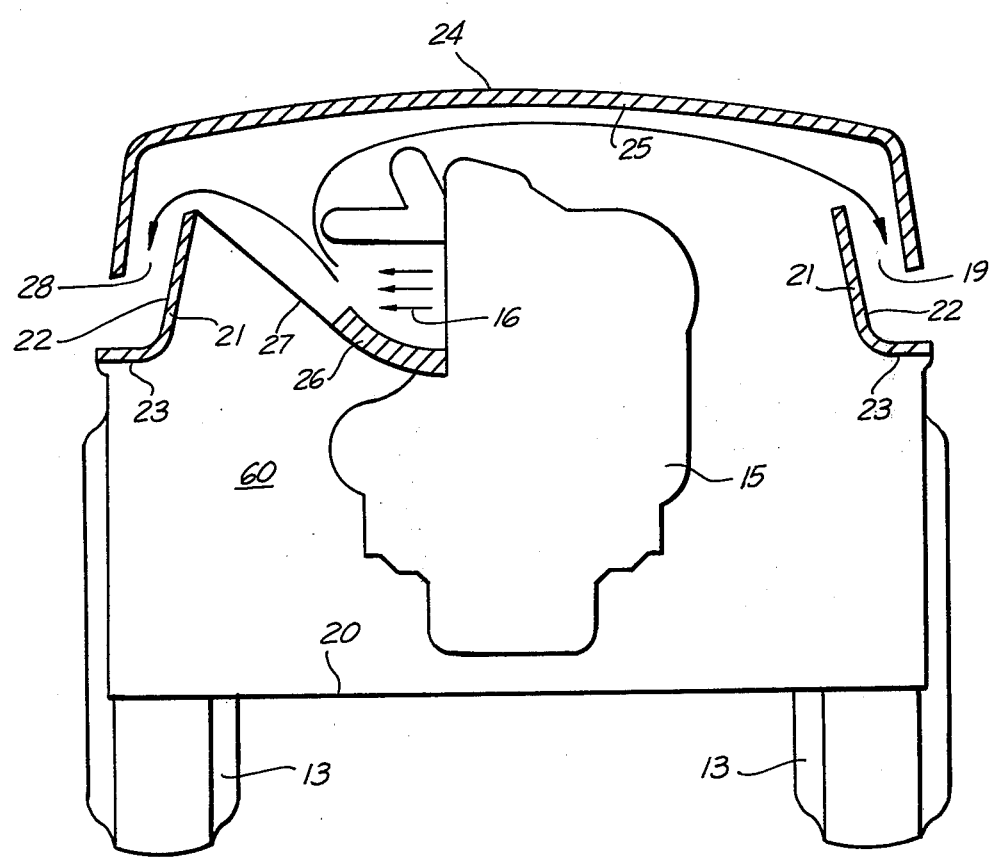
FIG. 3 is a section taken perpendicular to the longitudinal median plane of the vehicle through the engine compartment of another fork-lift truck embodying the invention.

If desired, only the intake duct or passage 4 may be provided in the counterweight or both passages 4 and 14 can be used to draw cooling air into the engine compartment. In this case, the air can be discharged as shown in FIG. 3. In this construction, air-discharge ducts are provided to either side of the engine 15 and can be disposed more or less symmetrically with the engine compartment being provided with baffles or deflectors guiding the outflowing air to the discharge passages. In this case, the central rib 18 between the passages 4 and 14 is eliminated and the passage can extend the full width of the counterweight.

In a less preferred construction, the flow passages 4 and 14 can be used for discharging the air which can be drawn in through the hood of the engine compartment.

In the embodiment shown in FIG. 3, which also uses a completely closed engine compartment, the air is discharged from the engine 15 which is mounted by elastomeric suspension elements in the chassis 20 by, for example, the system described in the aforementioned copending application. The entire interior of the engine compartment can be lined with acoustic-insulation mats which have been represented only diagrammatically at 25 on the hood 24 of the engine compartment. In this case, the engine compartment can enclose all noise-generating parts of the drive train including the internal-combustion engine 15, the pumps for the lifting hydraulics, power steering and other hydraulic systems, an electric generator and the pump of the vehicle-propelling transmission.

According to this aspect of the invention, the side walls 21 of the engine compartment are drawn inwardly and define discharge passages 22 with the hood 24. The lower portion of wall 21, represented at 23, defines a horizontal stretch of the flow path which continues into vertical stretches 28 and 29 thereof. All of the wall portions 21, 23, 24 are lined with acoustic-damping mats as shown at 25.

The air leaving the internal-combustion engine 15 can be guided by baffles such as that shown at 27 with an upward inclination to the passages 28 and 29. In this case, the baffles 27 may also be lined with acoustic insulation.

The baffles 27 may be rubber webs which are engaged at their ends so that they do not constitute acoustic transmission paths between the engine and the walls of the chassis or engine compartment.

We claim:

1. The combination with a fork-lift truck of a chassis, a solid cast counterweight and an engine compartment adjacent said counterweight, an internal-combustion engine in said engine compartment, means for inducing a flow of cooling air into said engine compartment and for discharging cooling air therefrom, and at least one flow passage extending generally horizontally formed in said counterweight and traversed by the cooling air, said flow passage being elongated in the direction of flow of the cooling air therethrough and having a length in said direction greater than the largest dimension of said flow passage transverse to said direction, said flow passage having an orifice open to the exterior and an orifice open to said compartment and being provided between said orifices with at least one bend preventing straight-line sound transmission from said compartment to the exterior along said passage, said flow passage being defined between said orifices with wall surfaces constituted by the materal of said counterweight, said bend constituting a sound-damping means enabling said counterweight to absorb at least part of the sound energy generated within said compartment.

2. The combination defined in claim 1 wherein said passage is provided with wall portions facing said compartment and extending generally transversely to the direction of flow of air between said orifices.

3. The combination defined in claim 2 wherein said wall portions are provided with acoustic-insulation mats.

4. The combination defined in claim 2 wherein said passage is at least partially lined with acoustic-insulation mats.

5. The combination defined in claim 1 wherein said counterweight is subdivided into two parts in a plane through said passage.

6. The combination defined in claim 1, further comprising a heat exchanger disposed in said flow passage proximal to said compartment for cooling a liquid.

7. The combination defined in claim 1 wherein two such flow passages are provided in said counterweight, said flow passages being mirror-symmetrically constructed, one of said flow passages serving to admit air to said compartment and the other of said flow passages discharging air from said compartment.

8. The combination defined in claim 7 wherein said flow passages are wider than they are high and extend over the major part of the width of the counterweight, said flow passages each having at least two bends respectively connected to upwardly and downwardly extending portions between the respective orifices.

9. The combination defined in claim 8 wherein one of said flow passages lies substantially parallel to the other and means is provided in the region of the orifices of said passages open to the atmosphere for guiding the air flows of the respective passages in opposite directions.

10. The combination defined in claim 1 wherein said engine has a combustion-air intake duct connected to and communicating with said flow passage.

11. The combination defined in claim 9 wherein said compartment is completely sealed in a sound-tight manner except for said flow passages.

12. The combination defined in claim 1 wherein said flow passage is an air intake passage and said compartment is provided along opposite sides with respective discharge openings each of which extends at least partially vertically and is defined by wall portions provided with acoustic-damping layers.

* * * * *